(12) United States Patent
Prokhorov

(10) Patent No.: US 9,934,689 B2
(45) Date of Patent: Apr. 3, 2018

(54) AUTONOMOUS VEHICLE OPERATION AT BLIND INTERSECTIONS

(71) Applicant: Toyota Motor Engineering & Manufacturing North America, Inc., Erlanger, KY (US)

(72) Inventor: Danil V. Prokhorov, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 189 days.

(21) Appl. No.: 14/574,122

(22) Filed: Dec. 17, 2014

(65) Prior Publication Data

US 2016/0179093 A1 Jun. 23, 2016

(51) Int. Cl.
*G05D 1/00* (2006.01)
*G08G 1/16* (2006.01)
*B60W 40/00* (2006.01)

(52) U.S. Cl.
CPC ............. *G08G 1/167* (2013.01); *B60W 40/00* (2013.01)

(58) Field of Classification Search
CPC ....... G05D 1/0011; G05D 1/0088; G08G 1/16
See application file for complete search history.

(56) References Cited

U.S. PATENT DOCUMENTS

| | | | |
|---|---|---|---|
| 8,179,241 B2 | 5/2012 | Sakai et al. | |
| 8,368,755 B2 | 2/2013 | Nishida et al. | |
| 2013/0325311 A1* | 12/2013 | Yoo | G08G 1/166 701/301 |

FOREIGN PATENT DOCUMENTS

| | | |
|---|---|---|
| JP | 2001101566 A | 4/2001 |
| JP | 2007102691 A | 4/2007 |
| JP | 2011108084 A | 6/2011 |

OTHER PUBLICATIONS

Kummerle R, Autonomous Driving in a Multi-level Parking Structure (2009).*

* cited by examiner

*Primary Examiner* — Genna M Mott
*Assistant Examiner* — Charles J Han
(74) *Attorney, Agent, or Firm* — Christopher G. Darrow; Darrow Mustafa PC

(57) ABSTRACT

An automated driving system for an autonomous vehicle may include a perception system and a computing device for detecting and tracking a location of an object within an obstructed viewing region blocked from view of sensors associated with the perception system. The computing device and perception system may identify an obstructed viewing region and detect an external imaging assist device located within a sensor field of the perception system. The imaging assist device is capable of transmitting images of the obstructed viewing region to the perception system. The computing device analyzes the images received from the imaging assist device for purposes of detecting an object within the obstructed viewing region and tracking its location relative to the autonomous vehicle. The computing device may transmit a command to an autonomous vehicle system to implement an autonomous vehicle maneuver based at least in part on the tracked location of the hidden object.

15 Claims, 3 Drawing Sheets

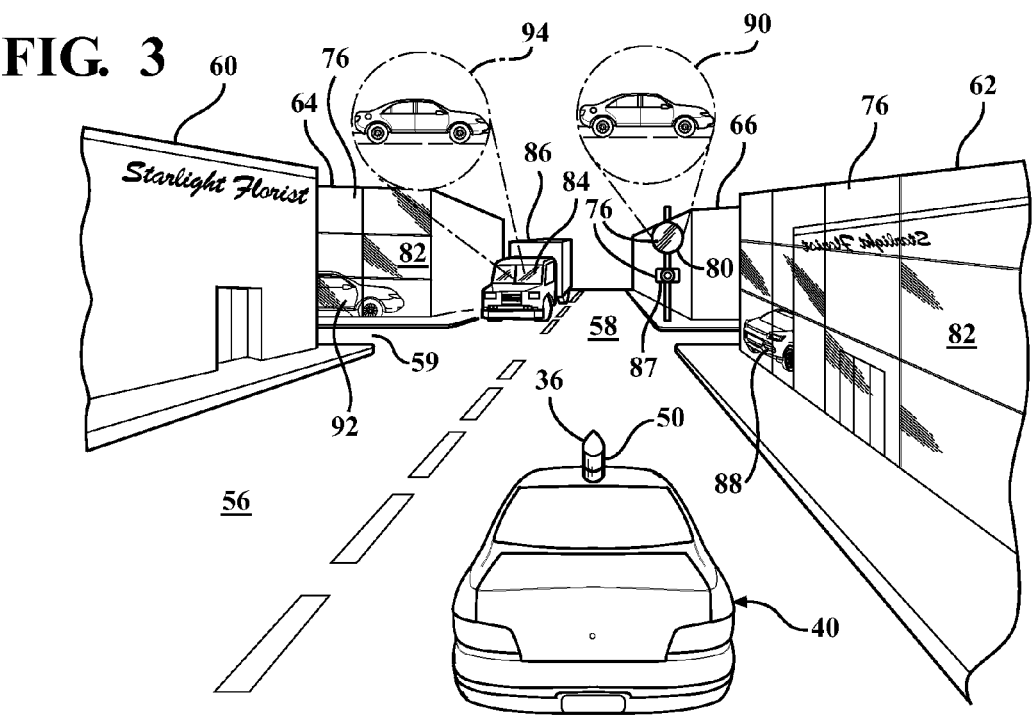
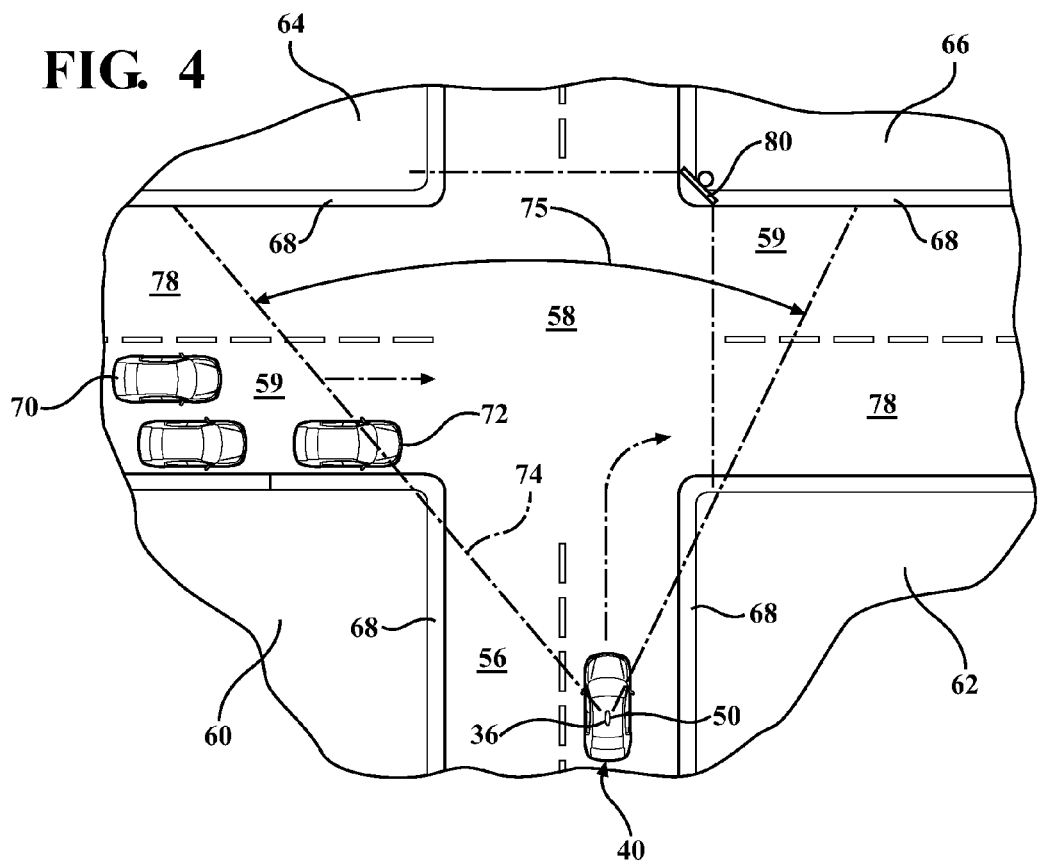

AUTONOMOUS VEHICLE OPERATION AT BLIND INTERSECTIONS

BACKGROUND

Partially-automated or monitored driving systems are designed to assist drivers in operating a vehicle safely and efficiently on the road, for example, using techniques such as lane tracking of the vehicle to send a warning to the driver when the vehicle is leaving its lane and controlling vehicle velocity based on distance to a vehicle ahead of the driver when adaptive cruise control is activated by the driver. The early detection of traffic or environmental conditions surrounding the vehicle is thus important for optimum performance of the monitored driving system.

Fully or highly automated, e.g. autonomous or self-driven, driving systems are designed to operate a vehicle on the road either without or with low levels of driver interaction or other external controls. Given the lack of driver interaction with a fully or highly automated vehicle, early detection of traffic conditions or environmental conditions surrounding the vehicle becomes of even greater importance. Current automated driving systems do not provide sufficient lead time to plan vehicle maneuvers for some difficult to detect traffic conditions.

SUMMARY

Disclosed is an automated driving system for an autonomous vehicle. The autonomous vehicle is configured to operate in a wide variety of environments similar to a conventional driver operated vehicle. This may include wide open spaces providing a clear field of view for vehicle sensors, as well as more congested spaces with restricted viewing, such as may be encountered in large metropolitan cities. The later may pose particular navigation difficulties for the autonomous vehicle due to numerous large objects that may block or limit a field of view of vehicle sensors and hinder operation of the autonomous vehicle. In some cities, for example, it is not uncommon for buildings to be located near the street, resulting, for example, in a blind intersection with a limited view of approaching traffic. The close proximity of the buildings and other objects to the street may significantly limit or block the field of view of the vehicle sensors and hinder the sensor's ability to detect the approaching traffic.

The disclosed automated driving system may include a perception system and a computing device for detecting and tracking a location of an object present within an obstructed viewing region blocked from view of sensors associated with the perception system. An obstructed viewing region may be encountered in a variety of conditions, for example, when approaching a blind intersection. The computing device, in conjunction with the perception system, may be configured to identify the obstructed viewing region and detect an external imaging assist device located within a sensor field of the perception system. The imaging assist device may include a reflective surface capable of transmitting an image of the obstructed viewing region to the perception system. The images received by the perception system from the imaging assist device may be analyzed by the computing device for purposes of detecting a hidden object within the obstructed viewing region. A location of the hidden object within the obstructed viewing region may be tracked relative to the autonomous vehicle based on the images received from the imaging assist device. The computing device may transit a command to an autonomous vehicle system to implement an autonomous vehicle maneuver based at least in part on the tracked location of the hidden object within the obstructed viewing region.

BRIEF DESCRIPTION OF THE DRAWINGS

The various features, advantages and other uses of the present apparatus will become more apparent by referring to the following detailed description and drawings, in which:

FIG. 3 is a schematic street level view of the autonomous vehicle operating in an exemplary environment with obstructed viewing;

FIG. 4 is an overhead view of the environment illustrated in FIG. 3.

DETAILED DESCRIPTION

Figure 1:
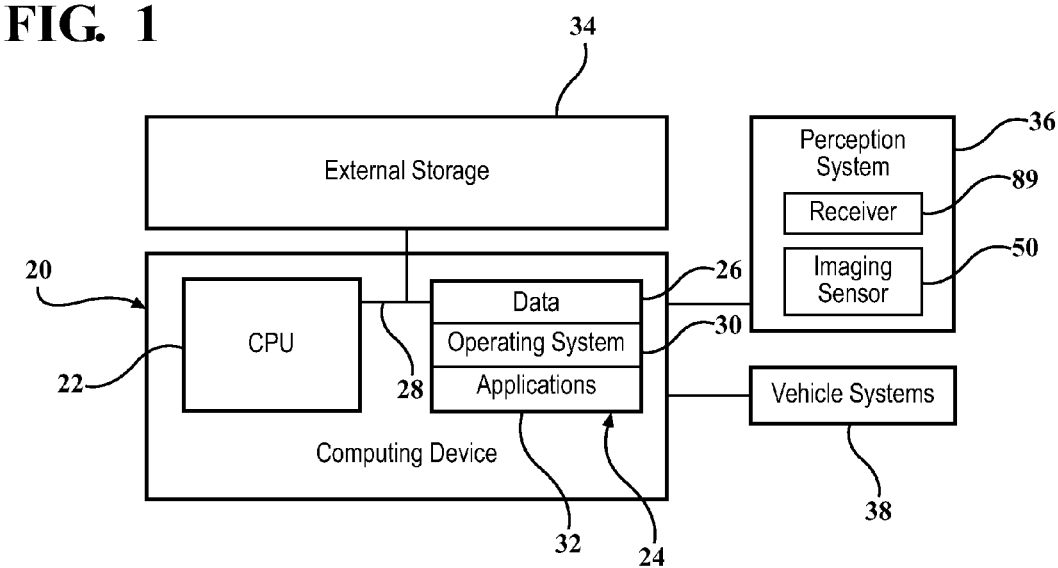
FIG. 1 is a block diagram of a computing device employed with an autonomous vehicle.

An automated driving system and methods implemented using the automated driving system are disclosed. The automated driving system may be configured to detect an obstructed viewing region in a vicinity of an autonomous vehicle. An imaging sensor associated with the automated driving system may be used to detect an external imaging assist device, such as a mirror or reflective surface of a nearby building or another vehicle, with a view of the obstructed viewing area. The imaging assist device is capable of transmitting an image of the obstructed viewing area to the automated driving system, which may use the image to detect objects hidden within the obstructed viewing region, such as vehicles, bicycles, and pedestrians. The automated driving system may track movement of the hidden objects based on multiple images received from the imaging assist device. Commands for implementing maneuvers of the autonomous vehicle may be transmitted to a vehicle system in response to the tracked movement of the hidden objects.

Referring now to the discussion that follows and also to the drawings, illustrative approaches to the disclosed systems and methods are described in detail. Although the drawings represent some possible approaches, the drawings are not necessarily to scale and certain features may be exaggerated, removed, or partially sectioned to better illustrate and explain the present invention. Further, the descriptions set forth herein are not intended to be exhaustive or otherwise limit or restrict the claims to the precise forms and configurations shown in the drawings and disclosed in the following detailed description.

FIG. 1 is a block diagram of an exemplary computing device 20 that may be employed with the autonomous driving system. Computing device 20 may be any type of vehicle-installed, handheld, desktop, or other form of single computing device, or may be composed of multiple computing devices. The processing unit in computing device 20 may be a conventional central processing unit (CPU) 22 or any other type of device, or multiple devices, capable of manipulating or processing information. A memory 24 in the computing device may be a random access memory device (RAM) or any other suitable type of storage device. Memory 24 may include data 26 that may be accessed by CPU 22 using a bus 28.

Memory 24 may also include an operating system 30 and installed applications 32, including programs that permit CPU 22 to perform the automated driving methods described below. Computing device 20 may also include secondary, additional, or external storage 34, for example, a memory card, flash drive, or any other form of computer readable medium. The installed applications 32 may be stored in whole or in part in external storage 34 and loaded into memory 24 as needed for processing.

Computing device 20 may also be in communication with a perception system 36 configured to capture data and/or signals for processing by an inertial measurement unit (IMU), a dead-reckoning system, a global navigation satellite system (GNSS), a light detection and ranging (LIDAR) system, a radar system, a sonar system, an image-based sensor system. In general, perception system 36 may be configured to capture information specific to the environment surrounding a vehicle, including information specific to objects, such as features of the route being travelled by the vehicle or other localized position data and/or signals, and outputting corresponding data and/or signals to the CPU 22.

If perception system 36 captures data for a LIDAR system, ranging data relating to intensity or reflectivity returns of the environment surrounding the vehicle may be captured. In the examples described below, perception system 36 may capture, at least, camera-based images and data for a LIDAR system or another system that measures vehicle distance from other vehicles, obstacles, objects, or other geographic features and road infrastructure, including traffic lights and road signs. Computing device 20 may also be in communication with one or more vehicle systems 38, such as a vehicle braking system, a vehicle propulsion system, and a vehicle steering system, in addition to other vehicle systems. One or more of the applications 32 may be configured to send commands to vehicle systems 38 to implement vehicle maneuvers based on the data collected by perception system 36.

Figure 2:
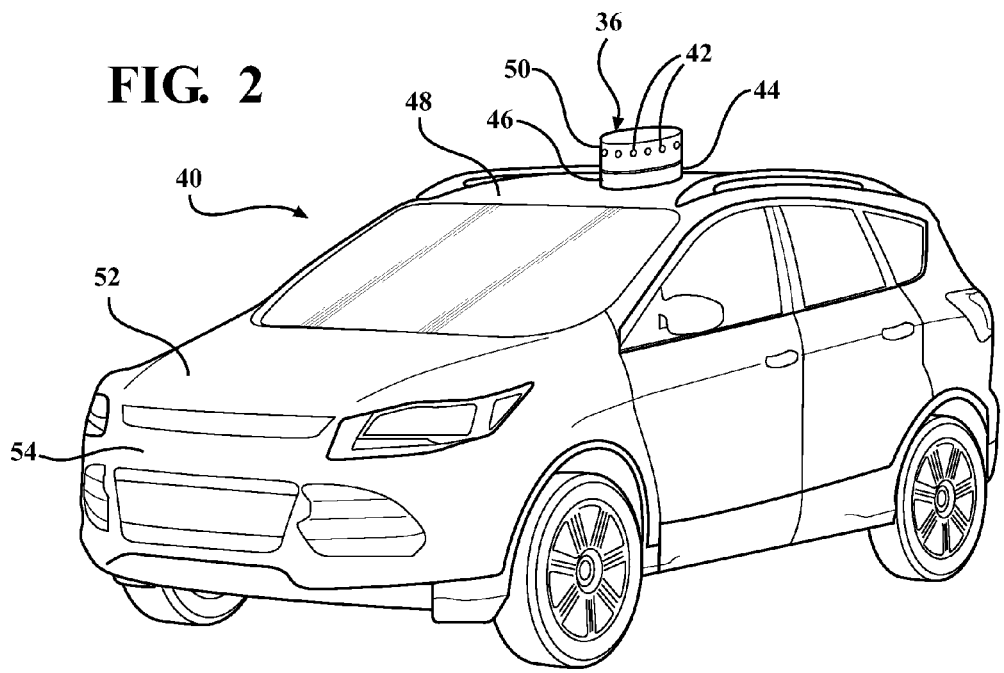
FIG. 2 is a schematic illustration of the autonomous vehicle employing an imaging sensor configured to communicate with the computing device of FIG. 1.

With reference to FIG. 2, an autonomous vehicle 40 may include perception system 36 configured to communicate with computing device 20 (see for example, FIG. 1). Computing device 20 may be located within autonomous vehicle 40 or may be located in an alternate location remote from autonomous vehicle 40. If computing device 20 is located remotely from autonomous vehicle 40, the vehicle and/or perception system 36 may include the capability of communicating with computing device 20.

Perception system 36 may include one or more sensors 42 positioned above autonomous vehicle 40. For example, sensors 42 may be located near an end of a stanchion 44. Stanchion 44 may be configured to rotate or have multiple views to cover a 360-degree area around autonomous vehicle 40. Stanchion 44 may be disposed within a vehicle mount 46 affixed to a roof 48 of autonomous vehicle 40. Alternatively, sensors 42 of perception system 36 may be disposed within a remote device, such as a remote-controlled drone or air-based device associated with autonomous vehicle 40 and configured to capture images from a position above autonomous vehicle 40. Sensors 42 may also be positioned inside autonomous vehicle 40 or integrated with various vehicle components, such as a bumper, roof, windshield and a hood, as well as other vehicle components.

Sensors 42 associated with perception system 36 may be configured to capture images for processing by an image sensor, the distance to objects within the surrounding environment for use by the computing device 20 to estimate position and orientation of the autonomous vehicle 40, or any other data and/or signals that may be used to determine a current state of the environment surrounding autonomous vehicle 40. For example, if sensors 42 capture data for use by a LIDAR system, laser returns from physical objects or geographic features in the area surrounding the autonomous vehicle 40 may be captured and images can be formed based on ranging distances calculated by measuring a time it takes for a signal to return to sensors 42. If sensors 42 are camera-based, sensors 42 may be positioned on stanchion 44 to provide an elevated view of the environment surrounding the autonomous vehicle 40.

Perception system 36 may include multiple interacting components, each configured to perform a particular operation or function. The separate components may be integrated into a single unit, or one or more of the components may be positioned at various locations throughout the vehicle. For example, perception system 36 may include one or more imaging sensors 50 configured to capture images of the environment surrounding autonomous vehicle 40. Imaging sensors 50 are shown incorporated into perception system 36 attached by stanchion 44 to the roof of the vehicle. Alternatively, imaging sensors 50 may located elsewhere on autonomous vehicle 40, for example, within an interior of the vehicle, such as on a dash, or on an exterior of the vehicle, such as a hood 52 or a front fascia 54. Sensors 42 may be located at any suitable location within or on autonomous vehicle 40 to optimize data and information collection.

Autonomous vehicle 40 is configured to operate in a wide variety of environments similar to a conventional driver operated vehicle. This may include wide open spaces providing a clear field of view for vehicle sensors 42, as well as more congested spaces with restricted viewing, such as may be encountered in large metropolitan cities. The later may pose particular navigation difficulties for autonomous vehicle 40 due to numerous large objects that may block or limit a field of view of sensors 42 and hinder operation of autonomous vehicle 40. In some cities, for example, it is not uncommon for buildings to be located near the street. The proximity of the buildings and other objects to the street may significantly limit or block the field of view of sensors 42 and hinder the sensor's ability to detect approaching traffic.

An example of a city environment with restricted viewing is illustrated in FIGS. 3 and 4. FIG. 3 is street level view looking forward from behind autonomous vehicle 40. FIG. 4 is an overhead view of the scene shown in FIG. 3. Autonomous vehicle 40 is depicted in FIGS. 3 and 4 traveling along a surface street 56 approaching an intersection 58. A cross street 59 intersects surface street 56 at intersection 58. Buildings are located on each of the four corners of intersection 58. A building 60 is located to a left of autonomous vehicle 40 and a building 62 is located to the right of the vehicle. Located on a far left far corner of intersection 58 is a building 64 and on a far right corner is a building 66. Buildings 60 and 62 are located adjacent a sidewalk 68 and close to surface street 56. The proximity of the buildings 60 and 62 to surface street 56 can block imaging sensor's 50 direct line of sight view of cross street 59 and hinder the sensor's ability to detect objects, such as a vehicle 70, that may be approaching intersection 58. In addition to buildings, other objects, such as vehicle 72 located along a sight line 74 of imaging sensor 50, may hinder detection of objects, such as vehicle 70 located in an adjacent lane. Other objects located in a vicinity of streets and roadways traveled by autonomous vehicle 40, such as traffic signs, advertising signs, landscaping, parked vehicles, as well as other objects, may block the field of view of imaging sensor 50. Objects, such as pedestrians and bicyclists, may also impede the field of view of imaging sensors 50.

With continued reference the example scenario illustrated in FIGS. 3 and 4, objects, such as buildings 60 and 62, may significantly narrow the field of view of imaging sensor 50. In the example shown in FIGS. 3 and 4, buildings 60 and 62 generally constrain a direct field of view 75 of imaging sensor 50 to an angular quadrant. The reduced direct field of view hinders imaging sensor's 50 ability to detect vehicle 70 as it approaches intersection 58. The direct field of view 75 of imaging sensor 50 tends to widen as autonomous vehicle 40 nears intersection 58, which may eventually enable imaging sensor 50 to directly detect vehicle 70, but the delay in detecting vehicle 70 may reduce the time autonomous vehicle 40 has to initiate vehicle maneuvers in response to vehicle 70. It is desirable that autonomous vehicle 40 have as much time as possible to react to objects in its path, which requires imaging sensor 50 to promptly detect objects as quickly as possible.

In instances where a direct field of view of imaging sensor 50 is blocked or impeded by an object, for example, buildings 60 and 62, perception system 36 may be configured to search for and detect one or more external imaging assist devices 76 capable of obtaining and relaying one or more images of an obstructed viewing region 78 to imaging sensor 50. Obstructed viewing region 78 corresponds to any region located outside the direct field of view 75 of imaging sensor 50. In the example scenario illustrated in FIGS. 3 and 4, obstructed viewing region 78 includes the regions blocked from direct view of imaging sensor 50 by buildings 60 and 62.

Imaging assist device 76 may include any reflective surface with a view of obstructed viewing region 78 blocked from direct view by imaging sensor 50. Imaging assist device 76 may be stationary or mobile. Several examples of imaging assist device 76 are illustrated in FIGS. 3 and 4, and may include a mirror 80, a reflective surface 82 of a building, for example, buildings 62 and 64, and a reflective surface 84 of another vehicle 86. Other reflective surfaces may also function as imaging assist device 76, such as, for example, a highly polished painted surface of a vehicle. Generally, any surface capable of reflecting an image may function as imaging assist device 76. The reflective surface of imaging assist device 76 may have various contours, and may include a generally flat surface, a contoured surface, or a combination thereof. For example, mirror 80 may be configured as a convex or concave mirror, whereas reflective surface 82 of buildings 62 and 64 may have a generally flat surface contour.

Imaging assist device 76 may also include a camera 87 configured to capture images of obstructed viewing region 78. Images captured by camera 87 may be transmitted to receiver 89 (see FIG. 1) associated with perception system 36.

With continued reference to the example scenario illustrated in FIGS. 3 and 4, autonomous vehicle 40 is shown traveling along surface street 56 intending to make a right turn on cross street 59. As autonomous vehicle 40 approaches intersection 58, vehicle 70, traveling on cross street 59 toward intersection 58, is blocked from direct view of imaging sensor 50 by building 60. Without the assistance of imaging assist device 76, autonomous vehicle 40 would not be aware of the presence of vehicle 70 until both vehicles were closer to intersection 58, thereby reducing the amount of time autonomous vehicle 40 has to react to vehicle 70. To avoid such a situation and maximize the amount of time available for implementing autonomous vehicle maneuvers in response to vehicle 70, perception system 36 commences searching for imaging assist devices 76 present within the direct field of view 75 of imaging sensor 50 upon detecting the presence of obstructed viewing region 78. In this particular example, there are several imaging assist devices 76 detectable by perception system 36, using, for example, imaging sensor 50. For example, perception system 36 may be configured to detect and monitor a reflection 88 of vehicle 70 from reflective surface 82 of building 62. Perception system 36 may also detect and monitor a reflection 90 of vehicle 70 from mirror 80. A reflection 92 of vehicle 70 from reflective surface 82 of building 64 may also be detected and monitored by perception system 36. Perception system 36 may also detect and monitor a reflection 94 of vehicle 70 from reflective surface 84 of vehicle 86. In each instance, perception system 36 may detect and monitor the reflected image of vehicle 70 to track a location of vehicle 70 within obstructed viewing region 78. Perception system 36 may continue to monitor and track the location of vehicle 70 using imaging assist devices 76 as long as vehicle 70 is blocked from a direct line of sight of imaging sensor 50. Once vehicle 70 enters the direct field of view 75 of imaging sensor 50, perception system 36 may cease using imaging assist device 76 to monitor the location of vehicle 70, but may continue to use the imaging assist device 76 to detect and monitor the location of other objects present within obstructed viewing region 78.

Figure 5:
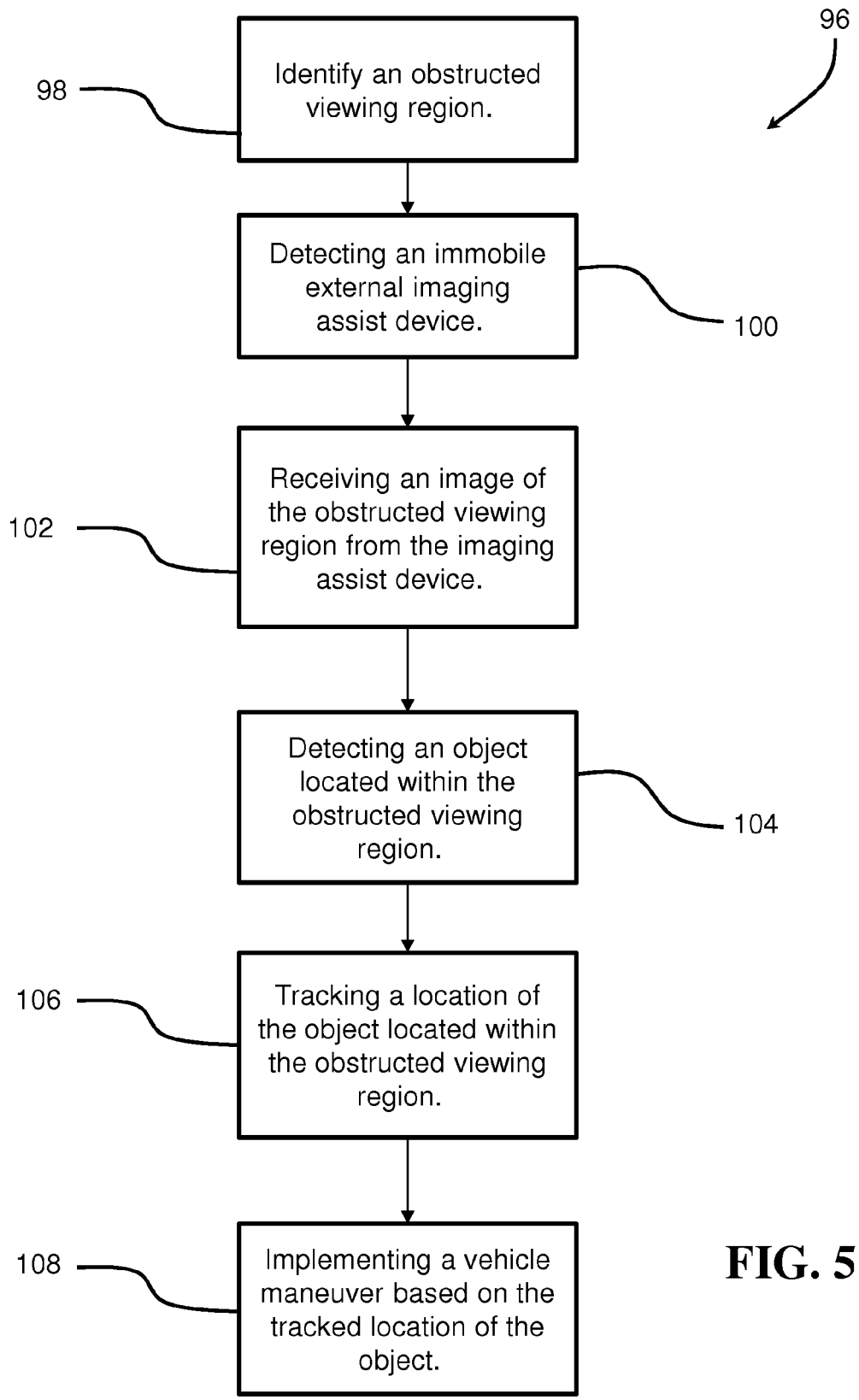
FIG. 5 is a logic flowchart of an exemplary process performed by the autonomous vehicle to detect and track a location of objects within an obstructed viewing region.

FIG. 5 is a logic flow chart of an exemplary process 96 performed by autonomous vehicle 40 for detecting and tracking a location of an object present within obstructed viewing region 78. In step 98, computing device 20 (see FIG. 1), with the assistance of perception system 36 (see FIGS. 1-4), detects the presence of an obstruction viewing region 78, using for example, imaging sensor 50 (see FIGS. 1-4). The presence of the obstructed viewing region 78 may be determined by detecting for example, objects, such as buildings 60 and 62, located in the field of view of imaging sensor 50. Detection of obstructed viewing region 78 prompts computing device 20, in conjunction with perception system 36, to commence, at step 100, searching for one or more imaging assist devices 76 with a view of obstructed viewing region 78.

Upon detecting an imaging assist device 76 with a view of obstructed viewing region 78, perception system 36 may commence receiving images of the obstructed viewing region 78 from imaging assist device 76 at step 102. At step 104, computing device 20 may analyze the images received by perception system 36 from imaging assist device 76 for purposes of detecting hidden objects, such as vehicle 70, within obstructed viewing region 78. If an object is detected within obstructed viewing region 78, computing device 20, with the assistance of perception system 36, may proceed at step 106 of the process to track a location of the hidden object within the obstructed viewing region 78. The location of the hidden object may continue to be tracked using the images received from imaging assist device 76 so long the object remains hidden within obstructed viewing region 78.

At step 108 of the process, computing device 20 may send one or more commands to one or more vehicle systems 38 (see FIG. 1) to implement one or more vehicle maneuvers based on the tracked location of the hidden object within obstructed viewing region 78. The vehicle maneuvers may include steering, accelerating, or braking, for example, in order to avoid the hidden obstacle.

It is intended that the scope of the present methods and apparatuses be defined by the following claims. However, it must be understood that the disclosed systems and methods for detecting and tracking objects located within an obstructed viewing region relative to an autonomous vehicle may be practiced otherwise than is specifically explained and illustrated without departing from its spirit or scope. It should be understood by those skilled in the art that various alternatives to the configurations described herein may be employed in practicing the claims without departing from the spirit and scope as defined in the following claims. The scope of the disclosed systems and methods should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future examples. Furthermore, all terms used in the claims are intended to be given their broadest reasonable constructions and their ordinary meanings as understood by those skilled in the art unless an explicit indication to the contrary is made herein. In particular, use of the singular articles such as "a," "the," "said," etc., should be read to recite one or more of the indicated elements unless a claim recites an explicit limitation to the contrary. It is intended that the following claims define the scope of the device and that the method and apparatus within the scope of these claims and their equivalents be covered thereby. In sum, it should be understood that the device is capable of modification and variation and is limited only by the following claims.

What is claimed is:

1. A method for operating an autonomous vehicle, the method comprising:
    identifying an obstructed viewing region blocked from a sensor field of a camera associated with the autonomous vehicle;
    detecting a reflective surface of a structure located within image data acquired by the camera, the reflective surface having a reflected image of at least a portion of the obstructed viewing region;
    detecting, using image data acquired by the camera, an object within the reflected image, at least a portion of the object being located within the obstructed viewing region;
    tracking a location of the object within the obstructed viewing region relative to the autonomous vehicle; and
    implementing an autonomous vehicle maneuver based at least in part on the tracked location of the object.

2. The method of claim 1, wherein the structure is a convex mirror.

3. The method of claim 1, wherein the structure is a building.

4. The method of claim 1, wherein tracking the location of the object within the obstructed viewing region comprises detecting at least a first location of the object and a second location of the object and predicting movement of the object relative to the autonomous vehicle based on the first and second locations.

5. The method of claim 1, wherein the structure is immobile.

6. The method of claim 1, wherein the camera is attached to the autonomous vehicle.

7. The method of claim 1, wherein the structure is a vehicle.

8. A method for operating an autonomous vehicle, the method comprising:
    detecting a reflective surface of a structure located within image data acquired by a camera associated with the autonomous vehicle, the reflective surface having a reflected image;
    detecting, using image data acquired by the camera, an object located within the reflected image;
    determining if the object is directly viewable within a sensor field of the camera; and
    tracking a location of the object relative to the autonomous vehicle based on the reflected image when the object is not located within the sensor field of the camera; and
    implementing an autonomous vehicle maneuver based on the tracked location of the object.

9. The method of claim 8, wherein the structure is a convex mirror.

10. The method of claim 8, wherein the structure is a building.

11. The method of claim 8, wherein the structure is immobile.

12. An automated driving system comprising:
    a camera operable to capture an image of a region surrounding an autonomous vehicle; and
    a computing device in communication with the camera, the computing device comprising:
        one or more processors for controlling operation of the computing device;
        a memory for storing data and program instructions used by the one or more processors, wherein the one or more processors are configured to execute instructions stored in the memory to:
        analyze the image captured by the camera;
        detect an external reflective surface within the captured image, the reflective surface having a reflected image of at least a portion of an obstructed viewing region;
        detect an object within the reflected image;
        track a location of the object based on the reflected image; and
        implement a vehicle maneuver based at least in part on the tracked location of the object.

13. The automated driving system of claim 12, wherein the reflective surface is a surface of a vehicle.

14. The automated driving system of claim 12, wherein the reflective surface is a surface of a convex mirror.

15. The automated driving system of claim 12, wherein the reflective surface is a surface of a building.

* * * * *